US012789729B2

(12) United States Patent
Bond et al.

(10) Patent No.: US 12,789,729 B2
(45) Date of Patent: Nov. 10, 2026

(54) METHOD AND SYSTEM FOR ORIENTATION OF A USER WITHIN A VEHICLE OR OTHER ENVIRONMENT

(71) Applicant: GM GLOBAL TECHNOLOGY OPERATIONS LLC, Detroit, MI (US)

(72) Inventors: Jacob Alan Bond, Rochester Hills, MI (US); Morgan Andrulis, St. Clair Shores, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 11 days.

(21) Appl. No.: 19/040,347

(22) Filed: Jan. 29, 2025

(65) Prior Publication Data

US 2026/0217208 A1 Jul. 30, 2026

(51) Int. Cl.
*B60R 16/037* (2006.01)
*B60K 35/28* (2024.01)

(52) U.S. Cl.
CPC ............ *B60R 16/037* (2013.01); *B60K 35/28* (2024.01)

(58) Field of Classification Search
None
See application file for complete search history.

(56) References Cited

U.S. PATENT DOCUMENTS 11,247,527 B2 * 2/2022 Maier ................ B60H 1/00564
11,443,260 B1 * 9/2022 van Breen ............. G08G 1/095
11,655,032 B2 * 5/2023 Stoner .................... B64D 11/00 244/118.6
11,948,110 B2 * 4/2024 Hoang ............. G06Q 10/06315
2003/0125855 A1 * 7/2003 Breed .................. B60N 2/0022 701/36
2003/0160497 A1 * 8/2003 Darr ................... B64D 45/0044 297/468
2018/0247381 A1 * 8/2018 Cronin ................... G06Q 50/12
2019/0239814 A1 * 8/2019 Tokuchi ................ A61B 5/1116
2019/0344707 A1 * 11/2019 Nelson ..................... B60N 2/58
2020/0331429 A1 * 10/2020 Thomas .................. B60R 22/34
2021/0058751 A1 * 2/2021 Bates ....................... H04W 4/42
2021/0213970 A1 * 7/2021 Almeida ................. G10L 15/22
2021/0394774 A1 * 12/2021 Zhang ..................... B60R 11/04
2023/0047872 A1 * 2/2023 Khamis .................. B60K 35/10
2024/0034170 A1 * 2/2024 Brannan ............... B60L 53/305
2024/0185145 A1 * 6/2024 Steinberg ............. G06Q 10/063
2025/0068028 A1 * 2/2025 Hisatsugu ............... B32B 27/08
2025/0135864 A1 * 5/2025 Wallborg ............... B60N 2/015

* cited by examiner

*Primary Examiner* — Fekadeselassie Girma
(74) *Attorney, Agent, or Firm* — Ingrassia Fisher & Lorenz, LLP | IFL

(57) ABSTRACT

In accordance with exemplary embodiments, methods and systems are provided that include one or more sensors one or more sensors of an environment in which a user is disposed, and a processor. The one or more sensors are configured to obtain sensor data as to the environment. The processor is coupled to the one or more sensors, and is configured to at least facilitate determining one or more available locations for the user to utilize within the environment, using the sensor data; and providing one or more assistance actions for the user with respect to the one or more available locations.

16 Claims, 4 Drawing Sheets

METHOD AND SYSTEM FOR ORIENTATION OF A USER WITHIN A VEHICLE OR OTHER ENVIRONMENT

TECHNICAL FIELD

The technical field generally relates to vehicles and other environments and, more specifically, to methods and systems for facilitating orientation within a vehicle or other environment, including of passengers, occupants, or other users with vision impairment and/or other disabilities.

BACKGROUND

Occupants of vehicles and other environments (e.g., automobiles, buses, trains, movie theaters, and other environments) may encounter obstacles or other issues for orientation of the user upon entering the environment, including for users that may have visual impairment and/or other disabilities.

Accordingly, it is desirable to provide methods and systems for facilitating user orientation within an environment, including for users that may have visual impairment and/or other disabilities.

SUMMARY

In accordance with an exemplary embodiment, a method is provided that includes obtaining sensor data as to an environment in which a user is disposed, via one or more sensors of the environment; determining, via a processor, one or more available locations for the user to utilize within the environment, using the sensor data; and providing one or more assistance actions for the user with respect to the one or more available locations, via instructions provided by the processor.

Also in an exemplary embodiment, the step of determining the one or more available locations includes determining, via the processor, one or more available seating locations that are not currently occupied, and in which the user may sit within the environment, using the sensor data; and the step of providing the one or more assistance actions includes performing the one or more assistance actions for the user to find the one or more available seating locations, via instructions provided by the processor.

Also in an exemplary embodiment, the step of providing the one or more assistance actions includes providing a notification to the user via transmission of a message identifying the one or more available seating locations to an electronic device of the user, via instructions provided by the processor.

Also in an exemplary embodiment, the step of providing the one or more assistance actions includes providing one or more notifications via one or more output modalities for the user to perceive at the respective locations of the one or more available seating locations, via instructions provided by the processor.

Also in an exemplary embodiment, the step of determining the one or more available locations further includes determining, via the processor, which of the one or more available seating locations include available clean seating locations that are both clean and not currently occupied, using the sensor data; and the step of providing the one or more assistance actions includes performing the one or more assistance actions for the user to find the one or more available clean seating locations, via instructions provided by the processor.

Also in an exemplary embodiment, the method further includes providing one or more additional assistance actions for the user to utilize one or more safety features associated with the one or more available seating locations, including one or more emergency exits, one or more emergency stop buttons, or both, via instructions provided by the processor.

Also in an exemplary embodiment, the step of determining the one or more available locations includes determining, via the processor, one or more available interfaces through which the user can interact with the environment, using the sensor data; and the step of providing the one or more assistance actions includes performing the one or more assistance actions for the user to find the one or more available interfaces and understand the method of interacting with those interfaces, via instructions provided by the processor.

Also in an exemplary embodiment, the environment includes a vehicle; the user includes a passenger of the vehicle; and the one or more available seating locations include one or more passenger seating locations of the vehicle.

Also in an exemplary embodiment, the method further includes determining, via the processor, a route and direction of movement of the vehicle, using the sensor data; and providing information to the passenger as to the route and the direction of movement of the vehicle, via instructions provided by the processor.

Also in an exemplary embodiment, the method further includes determining, via the processor, a location of seat belts for the one or more passenger seating locations; and providing one or more additional assistance actions assisting the passenger with use of the seat belts, via instructions provided by the processor.

In another exemplary embodiment, a system is provided that includes one or more sensors one or more sensors of an environment in which a user is disposed, and a processor. The one or more sensors are configured to obtain sensor data as to the environment. The processor is coupled to the one or more sensors, and is configured to at least facilitate determining one or more available locations for the user to utilize within the environment, using the sensor data; and providing one or more assistance actions for the user with respect to the one or more available locations.

Also in an exemplary embodiment, the one or more available locations include one or more available seating locations that are not currently occupied, and in which the user may sit within the environment, using the sensor data; and the processor is further configured to at least facilitate performing the one or more assistance actions for the user to find the one or more available seating locations.

Also in an exemplary embodiment, the processor is further configured to at least facilitate providing a notification to the user via transmission of a message identifying the one or more available seating locations to an electronic device of the user.

Also in an exemplary embodiment, the processor is further configured to at least facilitate providing one or more notifications via one or more output modalities for the user to perceive at the respective locations of the one or more available seating locations, via instructions provided by the processor.

Also in an exemplary embodiment, the processor is further configured to at least facilitate determining which of the one or more available seating locations include available clean seating locations that are both clean and not currently occupied, using the sensor data; and performing the one or more assistance actions for the user to find the one or more available clean seating locations, via instructions provided by the processor.

Also in an exemplary embodiment, the processor is further configured to at least facilitate providing one or more additional assistance actions for the user to utilize one or more safety features associated with the one or more available seating locations, via instructions provided by the processor.

Also in an exemplary embodiment, the processor is further configured to at least facilitate determining one or more available interfaces through which the user can interact with the environment, using the sensor data; and performing the one or more assistance actions for the user to find the one or more available interfaces and understand the method of interacting with those interfaces, via instructions provided by the processor.

Also in an exemplary embodiment, the environment includes a vehicle; the user includes a passenger of the vehicle; and the one or more available seating locations include one or more passenger seating locations of the vehicle.

Also in an exemplary embodiment, the processor is further configured to at least facilitate determining a location of seat belts for the one or more passenger seating locations; and providing one or more additional assistance actions assisting the passenger with use of the seat belts.

In another exemplary embodiment, a vehicle is provided that includes a body; a propulsion system for moving the body; one or more passenger seating locations; one or more sensors of configured to obtain sensor data as to an environment within the vehicle in which a passenger is disposed; and a processor that is coupled to the one or more sensors and that is configured to at least facilitate determining one or more available passenger seating locations in which the passenger may sit within the environment and that are not currently occupied, using the sensor data; determining which of the one or more available passenger seating locations include available clean passenger seating locations that are both clean and not currently occupied, using the sensor data; determination a location of one or more corresponding seat belts associated with the one or more available clean passenger seating locations; and performing assistance actions for the user with respect to the available clean passenger seating locations and the corresponding seat belts, including: providing a notification to the user via transmission of a message identifying the one or more available clean passenger seating locations to an electronic device of the user; providing one or more visual notifications for the user to see at respective locations of the one or more available clean passenger seating locations; and providing one or more audio notifications for the user to hear at the respective locations of the one or more available clean passenger seating locations.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
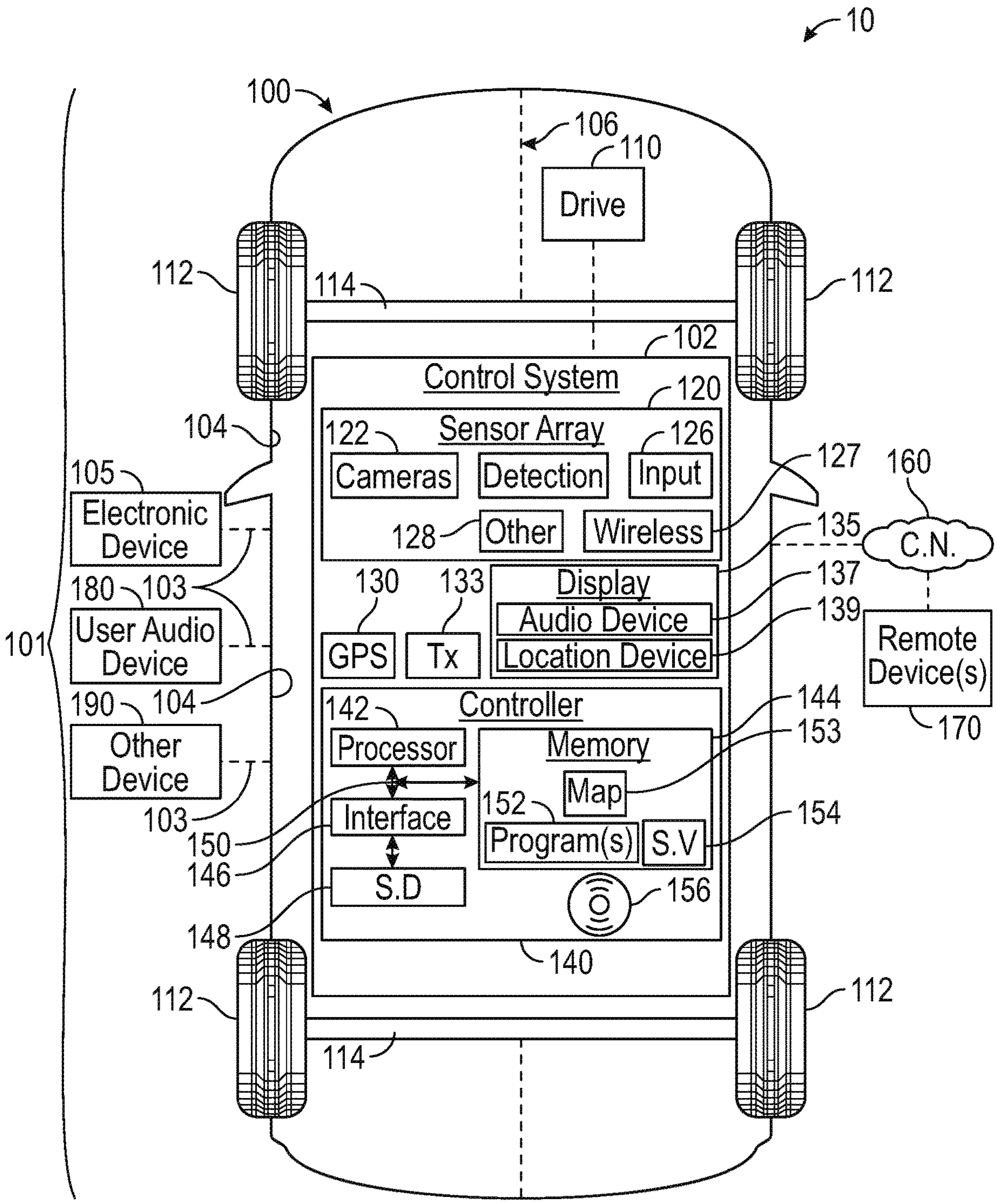
FIG. 1 is a functional block diagram of a system that includes an environment (e.g., a vehicle, movie theater or other environment), and including a control system for facilitating user orientation within the environment, including for users that may have visual impairment and/or other disabilities, in accordance with exemplary embodiments.

FIG. 1 is a functional block diagram of a system 10 that includes an environment 100 in which a user is to be present. As depicted in FIG. 1, in certain embodiments the environment 100 comprises a vehicle. In certain such embodiments, the environment 100 comprises an automobile. In certain other embodiments, the environment 100 comprises one or more other types of vehicles, such as one or more buses, trains, trucks, marine vehicles, aircraft, or the like. In various other embodiments, the environment 100 comprises one or more other types of environments 100 in which one or more individuals may be present. In various embodiments, the environment 100 may comprise a movie theater, a concert hall, a restaurant, an apartment building, an office building, a classroom, and/or any number of other types of environments in which passengers, users, and/or other occupants (collectively referred to as "users" herein for sake of convenience) may be present.

As depicted in FIG. 1, in various embodiments the system 10 may also include, among other possible features, a remote device 170 along with one or more user devices, such as one or more electronic devices 105 (e.g., a smart phone), one or more user audio devices 180 (e.g., a speaker or headphones), and/or other devices 190 (e.g., a haptic device) of the user.

As illustrated in FIG. 1, the system 10 further includes one or more wireless communication networks 160 that communicatively couple together the environment 100 and the remote device 170. In certain embodiments, the environment 100 may be representative of a number of different environments (e.g., in a fleet of vehicles, a chain of movie theaters, and so on) that are likewise coupled to the remote device 170 via the wireless communication networks 160, and that have similar features as those depicted in FIG. 1 and described below in connection with the environment 100. In certain embodiments, the remote device 170 may be representative of one or more other environments, remote servers, and/or infrastructure, among various other potential types of remote devices.

Also as depicted in FIG. 1, in an exemplary embodiment the environment 100 is also coupled to a electronic device 105 of a user of the environment 100 via one or more wireless connections 103. In certain embodiments, the electronic device 105 comprises a smart phone or related electronic device on an occupant of the environment 100. Also in certain embodiments, the environment 100 is coupled to the electronic device 105 via a short range wireless network, among other possible wireless connections 103 and/or networks. As depicted in FIG. 1 and as alluded to above, in various embodiments the environment may be similarly coupled to one or more user audio devices 180 (e.g., a speaker or headphones), and/or other devices 190 (e.g., a haptic device) of the user via the wireless connections 103 and/or networks.

In the depicted embodiment in which the environment 100 comprises a vehicle, the environment 100 includes a body 104 that is arranged on a chassis 116. The body 104 substantially encloses other components of the environment 100. The body 104 and the chassis 116 may jointly form a frame. The environment 100 also includes a plurality of wheels 112. The wheels 112 are each rotationally coupled to the chassis 116 near a respective corner of the body 104 to facilitate movement of the environment 100. In one embodiment, the environment 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain embodiments, the drive system 110 provides propulsion in accordance with a driver intent as manifested via the driver's engagement of an accelerator pedal. Also in certain embodiments, the drive system 110 may also provide automatic propulsion control in appropriate circumstances in accordance with instructions provided by the control system 102.

In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the environment 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the embodiment depicted in FIG. 1, the control system 102 is coupled to the drive system 110 as well as to the electronic device 105 and the remote device(s) 170. As noted above, in certain embodiments, the environment 100 includes one or more functions controlled automatically via the control system 102, including for facilitating user orientation within an environment, including for users that may have visual impairment and/or other disabilities.

As depicted in FIG. 1, in various embodiments, the control system 102 includes a sensor array 120, a location system 130, a transceiver 133, a display system 135, and a controller 140.

In various embodiments, the sensor array 120 includes various sensors that are used for facilitating of orientation of users within the environment. In the depicted embodiment, the sensor array 120 includes one or more cameras 122, other detection sensors 124, input sensors 126, and wireless sensors 127. In various embodiments, the sensor array 120 may also include one or more other sensors 128.

As used herein, the term "passenger" or "user" is used to refer to one or more human individuals that are travelling inside the environment 100, and who will be oriented within the environment 100 and heading to a final user destination after the environment 100 stops at the environment 100 destination at the end of the current vehicle drive. As used herein, the terms "occupant" and "user" (and/or similar terms) may also be used interchangeably, and with the same meaning, as "passenger".

In various embodiments, the cameras 122 obtain camera images as to an environment within the environment 100.

In certain embodiments, the sensor array 120 also includes one or more other detection sensors 124, instead of or in addition to the cameras 122. In various embodiments, the other detection sensors 124 include one or more radar sensors, Lidar sensors, sonar sensors, or the like, and obtain detection sensor data as to the environment.

In various embodiments, the one or more input sensors 126 obtain inputs as to preferences of the user (e.g., as to a preference for seating and other features pertaining to the environment 100). In various embodiments, the input sensors 126 may include one or more microphones (e.g., for audio inputs), touch screen sensors, buttons, knobs, or the like.

In various embodiments, the wireless sensors 127 are utilized for localizing the user (e.g., passenger, occupant, or other user), including while the user is within the environment 100. In certain embodiments, the wireless sensors 127 include one or more ultra-wide band (UWB) sensors, for example for use in locating the passenger and/or obstacles, including in certain embodiments in combination with one or more sensors of the electronic device 105 and/or the other detection sensors 124 of the environment 100.

In addition, in certain embodiments, the sensor array 120 may also include one or more other sensors 128, which may include (by way of example) one or more transmission and/or gear sensors of the environment 100 (e.g., as to whether the engine is turned on, and/or a current gear of the environment 100, and so on), one or more other types of detection sensors, one or more other sensors that measure vehicle parameters such as speed, acceleration, or the like.

Also in various embodiments, the location system 130 is configured to obtain and/or generate data as to a position and/or location in which the environment 100 is travelling and/or is about to park. In certain embodiments, the location system 130 comprises and/or or is coupled to a satellite-based network and/or system, such as a global positioning system (GPS) and/or other satellite-based system, and/or using a transmission control protocol (TCP) or the like.

In certain embodiments, the environment 100 also includes a transceiver 133. In various embodiments, the transceiver 133 communicates with the remote devices 170 via the one or more wireless communication networks 160, along with communication with the electronic device 105 via the wireless connection 103.

In various embodiments, the display system 135 provides information or instructions for one or more users of the environment 100, including as they are disposed within the environment 100. In various embodiments, the display system 135 includes an audio device 137, such as one or more speakers, that provide audible notifications for the passengers, in addition to one or more localization assistance devices 139 to further assist the user in the environment 100 (e.g., for providing flashing lights, beeping sounds, and the like for the user to locate one or more features of the environment 100). In certain embodiments, the display system 135 may also include one or more other components, such as a visual component (e.g., a display screen), a haptic component (e.g., by shaking a passenger seat or the electronic device 105), or the like.

In various embodiments, the controller 140 is coupled to the sensor array 120, the location system 130, the transceiver 133, and the display system 135, as well as to the remote devices 170 and the electronic device. In certain embodiments, the control system 102 is also coupled to the drive system 110 and/or to one or more other components of the environment 100. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 performs situational assistance for users of the environment 100 based on the sensor data obtained from the sensor array 120, and in various embodiments also from the location system 130 and the remote devices 170 (e.g., foot traffic data and/or other data pertaining to how busy the environment is) via the transceiver 133. In various embodiments, the controller 140 provides these and other functions in accordance with the steps of the processes and implementations depicted in FIGS. 2-4 and as described further below in connection therewith.

In various embodiments, the controller 140 (and, in certain embodiments, the control system 102 itself) is disposed within the body 104 of the environment 100. In one embodiment, the control system 102 is mounted on the chassis 116. In certain embodiments, the controller 140 and/or control system 102 and/or one or more components thereof may be disposed outside the body 104, for example on a remote device, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified environment 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the processes and implementations depicted in FIGS. 2-4 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 153 (e.g., from and/or used in connection with the location system 130 and/or transceiver 133) and one or more stored values 154 (e.g., including, in various embodiments, threshold values).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, the location system 130, and/or the remote devices 170. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the processes and implementations of FIGS. 2-4 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, as depicted in FIG. 1 and as described above, in various embodiments the remote device 170 is coupled to the environment 100 via the one or more wireless communication networks 160. Similar to the discussion above, in various embodiments, the remote device 170 depicted in FIG. 1 may be representative of one or more different remote devices 170 that comprise and/or are part of and/or coupled to one or more other vehicles, buildings, other environments, remote servers, infrastructure, or the like.

In various embodiments, the remote device 170 provides sensor data, such as foot traffic data and/or other data pertaining to how busy the environment is, and/or other information as to the environment 100, including other vehicles, pedestrians, and/or other objects that may be in the path of or in proximity to the user.

Also in various embodiments, the electronic device 105 receives information and instructions from the control system 102 via the transceiver 133, along the wireless connection 103, including instructions for the user's orientation within the environment 100. In various embodiments, the user audio device 180 and/or other devices 190 may similarly be used to facilitate the user's orientation within the environment 100.

Also as depicted in FIG. 1, in an exemplary embodiment a subsystem 101 of the system 10 of FIG. 1 is denoted as including the environment 100 and devices 105, 180, and 190 of the user.

Figure 2:
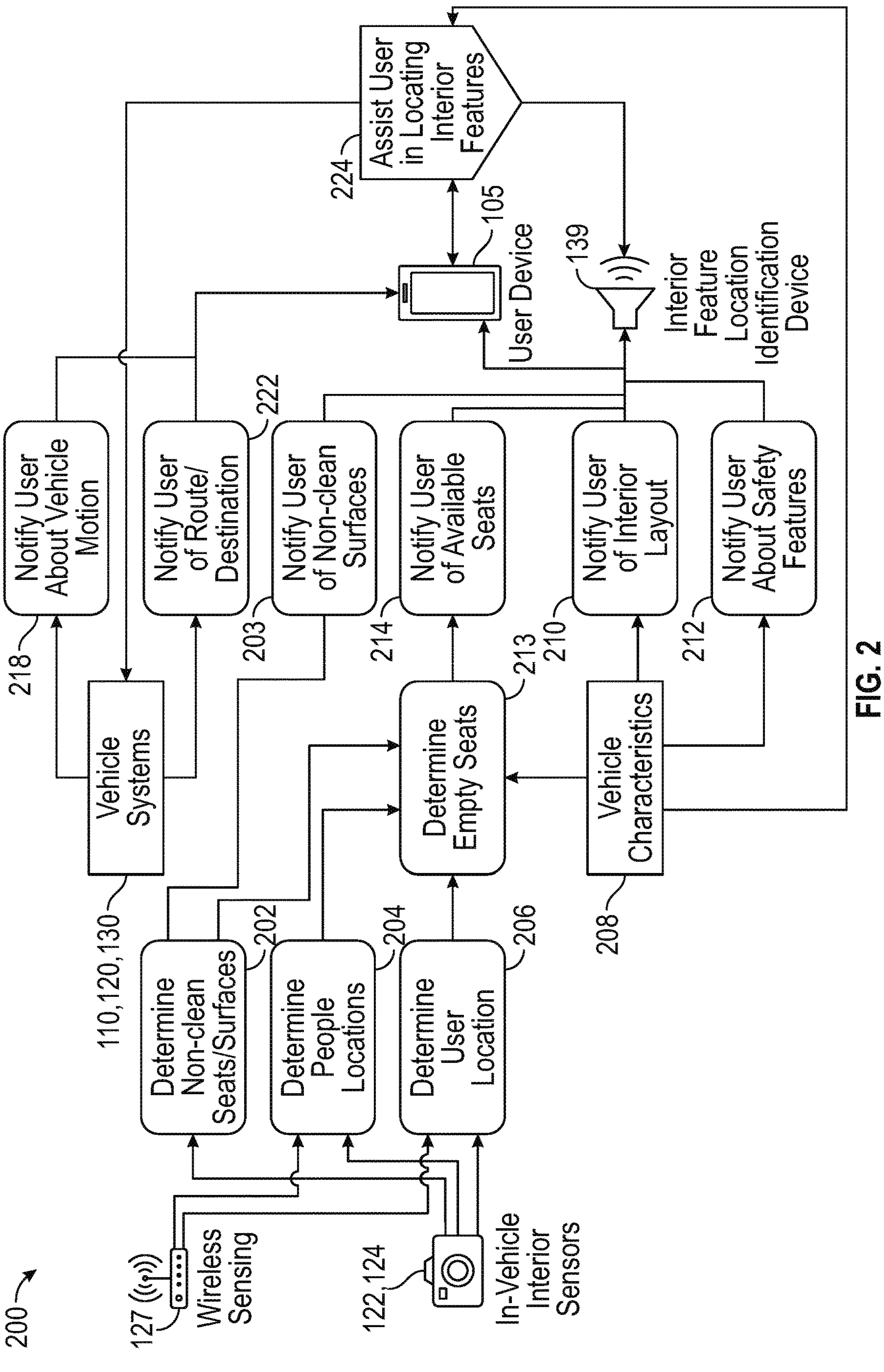
FIG. 2 is a flowchart for a process for facilitating situational awareness for users within an environment, including for users that may have visual impairment and/or other disabilities, and that can be implemented in connection with the system of FIG. 1, including the remote device and the vehicle and control system, in accordance with exemplary embodiments.

FIG. 2 is a flowchart for a process 200 for facilitating user orientation within an environment, including for users that may have visual impairment and/or other disabilities, in accordance with an exemplary embodiment. In various embodiments, the process 200 can be implemented in connection with the system 10 of FIG. 1, including the environment 100 and the control system 102 thereof, and further including the remote device 170 and the passenger's electronic device 105, user audio device 180, and other user devices 190, in accordance with exemplary embodiments.

In various embodiments, the process 200 is discussed below in connection with FIG. 2 as well as FIG. 3 (which provides a flowchart of a subroutine representing a step of the process 200 of FIG. 2, namely the step of assisting the user with any optional or additional alerts, such as in accordance with a customizable feature), in accordance with exemplary embodiments) and FIG. 4 (which provides a block diagram of the subsystem 101 of FIG. 1, including the environment 100 and devices 105, 180, and 190 of the user, in accordance with exemplary embodiments).

As depicted in FIG. 2, the process 200 begins when the user enters the environment 100. In one embodiment, the steps of the process 200 are performed continuously while the user is disposed within the environment.

In various embodiments, determinations are made as to which surfaces or seating locations (e.g., passenger seats, other seating locations such as for wheel chairs and/or other devices, or the like) of the environment are clean (step 202). In various embodiments, this is performed by the processor 142 of FIG. 1 based on wireless sensing data from one or more cameras 122 and/or other detection sensors 124 of FIG. 1. In certain embodiments, the cleanliness of surfaces and seating locations may also be obtained from one or more other sources, such as a database maintained by a building manager, server, company, or the like that maintains the environment (e.g. if a surface or chair is flagged for cleaning, and so on). Also in certain embodiments, the locations may also include one or more available locations of available interfaces through which the user can interact with the environment (e.g., seating adjustments and controls, climate control, lighting, infotainment, and so on), as determined using the sensor data.

In various embodiments, one or more notifications are provided to the user as to any unclean seating locations or surfaces (step 203). In certain embodiments, the notifications are provided in accordance with instructions that are provided by the processor 142 of FIG. 1 and that are implemented via and/or provided to one or more of the display system 135 (e.g., audio device 137 and/or location device 139 thereof), and/or by or to the electronic device 105 (e.g., cell phone), user audio device 180 (e.g., headphones or speaker), and/or other devices 190 (e.g., haptic device) of the user.

Also in various embodiments, determinations are made as to the locations of other individuals within the environment (step 204). In various embodiments, this is performed by the processor 142 of FIG. 1 based on wireless sensing data from one or more wireless sensors 127 and cameras 122 and/or other detection sensors 124 of FIG. 1.

In various embodiments, determinations are also made as to the location of the user (i.e., the user that is the subject of the process 200 and who requires orientation within the environment 100) (step 206). In various embodiments, this is performed by the processor 142 of FIG. 1 based on wireless sensing data from one or more wireless sensors 127 and cameras 122 and/or other detection sensors 124 of FIG. 1.

In various embodiments, determinations are made as to characteristics of the environment (step 208). In various embodiments, the characteristics may include, by way of example, seating arrangements, stairs, walkways, seat belt locations, other safety features and information relating thereto, and the like, of the environment 100. In various embodiments, this is performed by the processor 142 of FIG. 1 based on stored values 154 from the memory 144 of FIG. 1, and/or may also be based on wireless sensing data from one or more wireless sensors 127 and cameras 122 and/or other detection sensors 124 of FIG. 1 in certain embodiments.

In various embodiments, one or more notifications are also provided to the user as to an interior layout (e.g., pertaining to access to the seating) (step 210) and regarding safety features (e.g., seat belts, emergency exits, emergency stop buttons, and so on) (step 212) of the environment. In certain embodiments, the notifications are provided in accordance with instructions that are provided by the processor 142 of FIG. 1 and that are implemented via and/or provided to one or more of the display system 135 (e.g., audio device 137 and/or location device 139 thereof), and/or by or to the electronic device 105 (e.g., cell phone), user audio device 180 (e.g., headphones or speaker), and/or other devices 190 (e.g., haptic device) of the user.

In various embodiments, determinations are made as to available (e.g., empty, or non-occupied) locations (e.g., seating locations) of the environment (step 213). In various embodiments, this is performed by the processor 142 of FIG. 1 based on the clean seat determinations of step 202, the location of individuals of step 204, the user location of step 206, and the characteristics of step 208. In various embodiments, an available seat is determined to be a seat of the environment 100 that is easily accessible by the user given the user's location, and that is also unoccupied and clean.

In various embodiments, one or more notifications are provided to the user as to available seating locations (step 214). In certain embodiments, the notifications are provided based on (on providing information as to) the available seating locations as determined in step 213, and in accordance with instructions that are provided by the processor 142 of FIG. 1 and that are implemented via and/or provided to one or more of the display system 135 (e.g., audio device 137 and/or location device 139 thereof), and/or by or to the electronic device 105 (e.g., cell phone), user audio device 180 (e.g., headphones or speaker), and/or other devices 190

(e.g., haptic device) of the user, and/or one or more modalities, and may include and/or be characterized as one or more assistance actions for the user to perceive at the respective locations of the one or more available seats, via instructions provided by the processor, among other possible notifications and actions.

Also notifications are also provided as to motion of the environment (e.g., in the case of a vehicle) (step 218) and a route and destination, if applicable (step 222). In various embodiments, this information is determined by the processor 142 based on information provided by one of more vehicle systems (e.g., the drive system 110, sensor array 120, and/or location system 130 of FIG. 1). Also in various embodiments, these notifications are provided in accordance with instructions that are provided by the processor 142 of FIG. 1 and that are implemented via and/or provided to one or more of the display system 135 (e.g., audio device 137 and/or location device 139 thereof), and/or by or to the electronic device 105 (e.g., cell phone), user audio device 180 (e.g., headphones or speaker), and/or other devices 190 (e.g., haptic device) of the user.

Also in various embodiments, assistance is provided for the user with any optional or additional alerts (step 224). In various embodiments, the processor 142 provides additional instructions for assisting the user in locating interior features of the environment 100, such as by way of example providing instructions implemented by the localization assistance devices 139 that assist the user (e.g., by providing flashing lights, beeping sounds, and/or other actions to assist the user). In certain embodiments, these additional instructions are provided relating to any optional or additional alerts that may be pre-selected by a user, in accordance with a customizable feature. In certain embodiments, the actions and instruction may also include performing one or more assistance actions for the user to find the one or more available interfaces and understand the method of interacting with those interfaces (e.g., for seating adjustments and controls, climate control, infotainment, and so on), via instructions provided by the processor.

Figure 3:
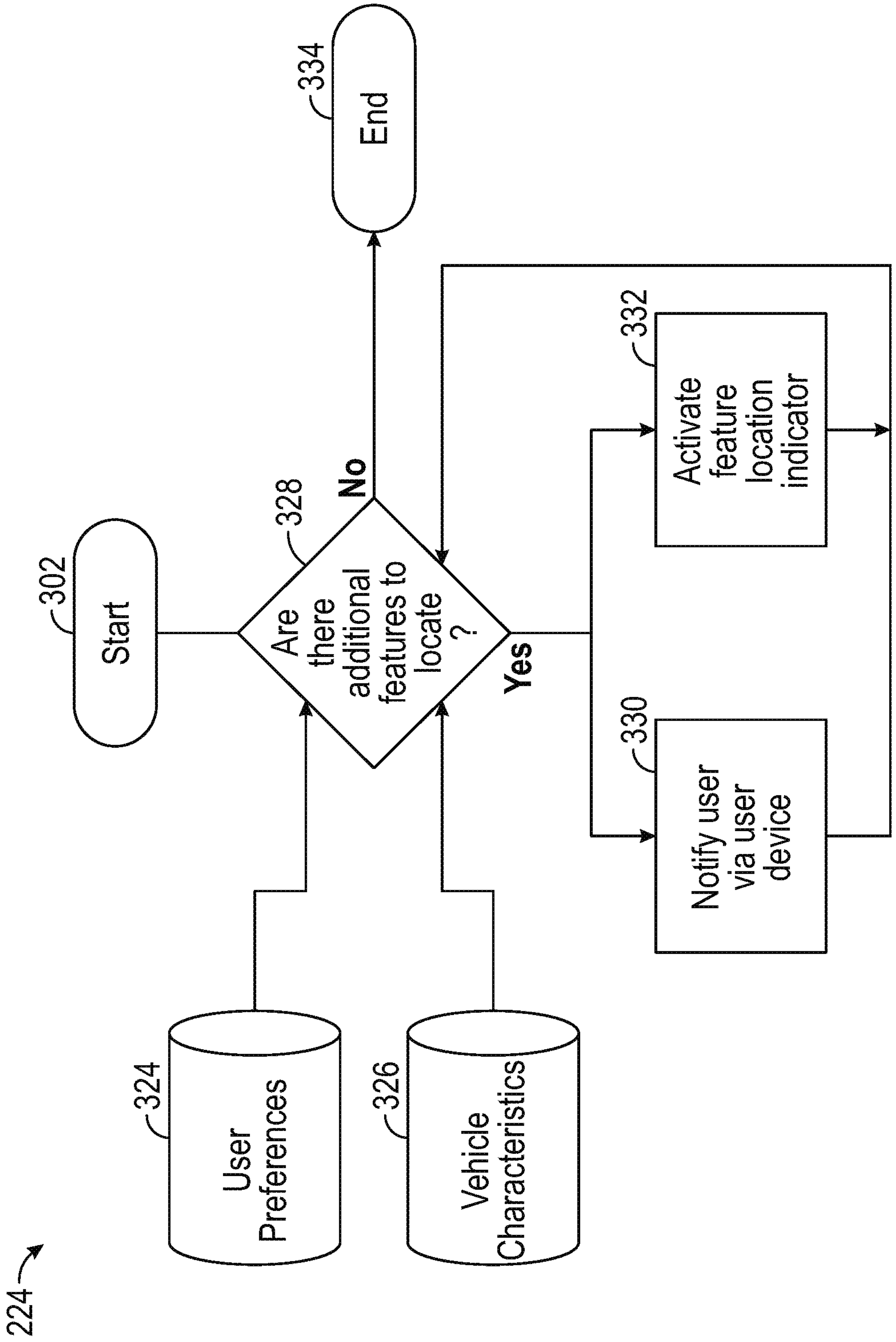
FIG. 3 is a flowchart of a subroutine representing a step of the process of FIG. 2, namely the step of assisting the user with any optional or additional alerts (e.g., in accordance with a customizable feature), in accordance with exemplary embodiments.

With reference to FIG. 3, a flowchart is provided for an exemplary illustration of step 224 of FIG. 2, namely of providing assistance for the user with any optional or additional alerts. As depicted in FIG. 3, in an exemplary embodiment once the sub-process of step 224 begins at step 302, user preferences are obtained (step 324) along with environmental characteristics (step 326).

In certain embodiments, the user preferences of step 324 are obtained via one or more input sensors 126 of FIG. 1 and/or in combination with the electronic device 105 of FIG. 1. Also in certain embodiments, the user preferences may include, among other user inputs, the user's preference as to the type of seating and/or other characteristics of the environment 100, and/or the types of features for which the user may require assistance. For example, if the user is located within his or her own vehicle (with which the user is familiar), the individual may have a different set of preferences as compared with being in a strange environment, and so on. Also in certain embodiments, the user preference may include whether and to what extent the user desires assistance with seat reclining, other seat adjustments, climate control, window access and/or control, door access and/or locking and unlocking, infotainment control, and so on).

In certain embodiments, the environmental characteristics are obtained via the stored values 154 and/or sensor array 120, and correspond to seating, safety features, and/or other characteristics, such as described in connection with step 208 (vehicle characteristics) of FIG. 2.

With continued reference to FIG. 3, in an exemplary embodiment, determinations are made as to whether there are any additional features to locate and/or report (step 328). In certain embodiments, this is determined by the processor 142 based on the user preferences of step 324 and the vehicle characteristics of step 326. In certain embodiments, the additional features are reported to the user, and information regarding the features are also sent to the vehicle 100 for the purpose of activating the localization assistance devices 139 (e.g., lights, chimes, and the like).

In various embodiments, notifications are provided to the user as to any relevant features (step 330). Specifically, in various embodiments, the processor 142 provides instructions to the display system 135 (e.g., the audio device 137 thereof) and/or to the electronic device 105, user audio device 180, and/or other user devices 190 of FIG. 1 to provide notifications to the user with the location, availability, and instructions pertaining to any seating, safety features, and/or components of the vehicle characteristics of step 326 that are consistent with the user preferences of step 324 and that have not already been provided via prior notification to the user.

Also in various embodiments, feature location indicators are also provided for the user as to any relevant features (step 332). Specifically, in various embodiments, the processor 142 provides instructions to the display system 135 (e.g., the location device 139 thereof) to provide location assistance (e.g., blinking lights, beeping sounds, and the like) for the user pertaining to any seating, safety features, and/or components of the vehicle characteristics of step 326 that are consistent with the user preferences of step 324 and that have not already been provided via prior notification to the user.

In various embodiments, once steps 330 and 332 are performed for each of the relevant features (i.e., once it is determined in step 328 that no additional reporting is needed), then the process terminates at step 334.

As noted above, FIG. 4 provides a block diagram of a subsystem 101 of the system 10 of FIG. 1, including the environment 100 and devices 105, 180, and 190 of the user, in accordance with exemplary embodiments.

Figure 4:
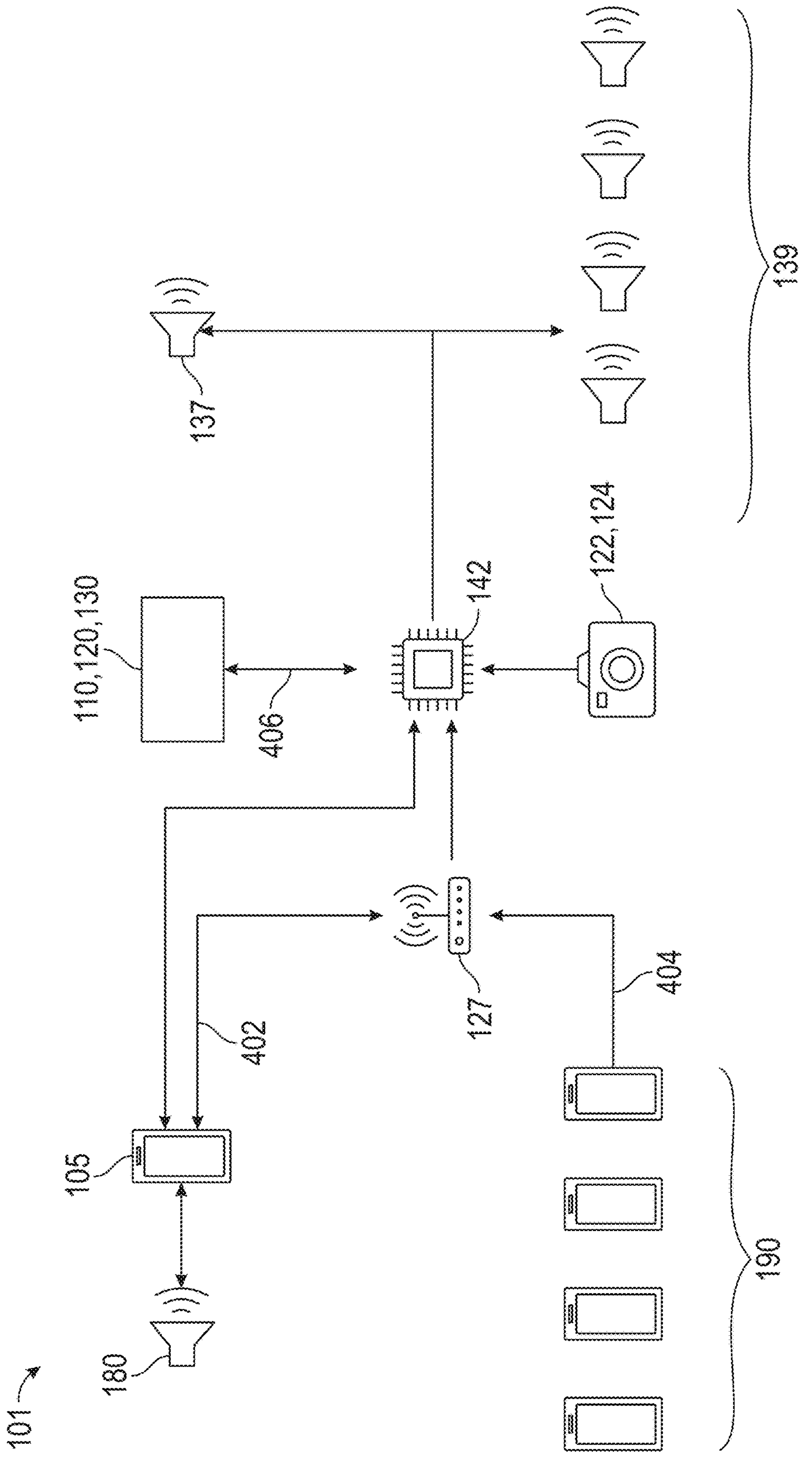
FIG. 4 is a block diagram of a subsystem of the system of FIG. 1, including the environment 100 and devices of the user, in accordance with exemplary embodiments.

As depicted in FIG. 4, in various embodiments, in various embodiments a user audio device 180 (e.g., one or more headphones, speakers, or the like) are utilized in connection with the electronic device 105, and the wireless sensors 127 perform wireless sensing 402 with respect to these devices. Also as depicted in FIG. 4, the wireless sensors 127 also perform additional wireless sensing 404 with respect to the other user devices 190.

Also as depicted in FIG. 4, the processor 142 includes detection sensor data from the in-vehicle cameras 122 and other detection sensors 124, along with data from the electronic device 105 and wireless sensors 127. In addition, in various embodiment, the processor 142 further receives information from vehicle systems, including the drive system, sensor array 120, and location system 130 of FIG. 1, including dynamic information 406 as to navigation, motion, and the like (e.g., as described above in connection with FIGS. 2 and 3). Also in various embodiments, as depicted in FIG. 4, after performing its various determinations using the various forms of data, the processor 142 provides instructions to and that are implemented by the audio device 137 and the location device 139 of the display system 135, also as described above in connection with FIGS. 2 and 3.

Accordingly, methods, systems, and vehicles are provided for facilitating user orientation for users inside an environment.

It will be appreciated that the systems, vehicles, and methods may vary from those depicted in the Figures and described herein. For example, the system 10, including the remote device 170, the environment 100 of FIG. 1 and the control system 102 thereof, and/or other components thereof may differ from that depicted in FIG. 1. It will similarly be appreciated that the steps of the processes and implementations of FIGS. 2-4 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining sensor data as to an environment in which a user is disposed, via one or more sensors of the environment;

determining, via a processor, one or more available locations for the user to utilize within the environment, including one or more passenger seats of a vehicle of the environment that are available, and in which the user may be seated within the environment and within the vehicle, using the sensor data;

determining, via the processor, which of the one or more passenger seats are available and not occupied, and further have a clean seating surface on which the user may sit, using the sensor data; and providing one or more assistance actions for the user with respect to the one or more available locations, including the one or more passenger seats that are available and not occupied, and further that have a clean seating surface on which the user may sit, via instructions provided by the processor.

2. The method of claim 1, wherein the step of providing the one or more assistance actions comprises providing a notification to the user via transmission of a message identifying the one or more available seating locations to an electronic device of the user, via instructions provided by the processor.

3. The method of claim 1, wherein the step of providing the one or more assistance actions comprises providing one or more notifications via one or more output modalities for the user to perceive at the respective locations of the one or more available seating locations, via instructions provided by the processor.

4. The method of claim 1, further comprising: providing one or more additional assistance actions for the user to utilize one or more safety features associated with the one or more available seating locations, via instructions provided by the processor.

5. The method of claim 1, wherein:

the step of determining the one or more available locations comprises determining, via the processor, one or more available interfaces through which the user can interact with the environment, using the sensor data; and the step of providing the one or more assistance actions comprises performing the one or more assistance actions for the user to find the one or more available interfaces and understand the method of interacting with those interfaces, via instructions provided by the processor.

6. The method of claim 1, further comprising:

determining, via the processor, a route and direction of movement of the vehicle, using the sensor data; and providing information to the passenger as to the route and the direction of movement of the vehicle, via instructions provided by the processor.

7. The method of claim 1, further comprising:

determining, via the processor, a location of seat belts for the one or more passenger seating locations; and providing one or more additional assistance actions assisting the passenger with use of the seat belts, via instructions provided by the processor.

8. The method of claim 1, wherein the determining of whether the one or more passenger seats have a clean seating surface is based on whether the seating surface is flagged for cleaning by a service that maintains the environment.

9. The method of claim 1, wherein the determining of whether the one or more passenger seats have a clean seating surface is based on whether the seating surface comprises a clean seating surface on which a wheelchair may be placed for seating by the user in the wheel chair.

10. A system comprising:

one or more sensors of an environment in which a user is disposed, the one or more sensors configured to obtain sensor data as to the environment; and a processor that is coupled to the one or more sensors and that is configured to at least facilitate:

determining one or more available locations for the user to utilize within the environment, including one or more passenger seats of a vehicle of the environment that are available, and in which the user may be seated within the environment and within the vehicle, using the sensor data;

determining, via the processor, which of the one or more passenger seats are available and not occupied, and further have a clean seating surface on which the user may sit, using the sensor data; and providing one or more assistance actions for the user with respect to the one or more available locations, including the one or more passenger seats that are available and not occupied, and further that have a clean seating surface on which the user may sit.

11. The system of claim 10, wherein the processor is further configured to at least facilitate providing a notification to the user via transmission of a message identifying the one or more available seating locations to an electronic device of the user.

12. The system of claim 10, wherein the processor is further configured to at least facilitate providing one or more notifications via one or more output modalities for the user to perceive at the respective locations of the one or more available seating locations, via instructions provided by the processor.

13. The system of claim 10, wherein the processor is further configured to at least facilitate providing one or more additional assistance actions for the user to utilize one or more safety features associated with the one or more available seating locations, via instructions provided by the processor.

14. The system of claim 10, wherein the processor is further configured to at least facilitate:

determining one or more available interfaces through which the user can interact with the environment, using the sensor data; and performing the one or more assistance actions for the user to find the one or more available interfaces and understand the method of interacting with those interfaces, via instructions provided by the processor.

15. The system of claim 14, wherein the processor is further configured to at least facilitate:

determining a location of seat belts for the one or more passenger seating locations; and providing one or more additional assistance actions assisting the passenger with use of the seat belts.

16. A vehicle comprising:

a body;

a propulsion system for moving the body;

one or more passenger seating locations;

one or more sensors of configured to obtain sensor data as to an environment within the vehicle in which a passenger is disposed; and a processor that is coupled to the one or more sensors and that is configured to at least facilitate:

determining one or more available passenger seating locations in which the passenger may sit within the environment and that are not currently occupied, including one or more passenger seats that are available, using the sensor data;

determining which of the one or more available passenger seating locations comprise available clean passenger seating locations that are both clean, having a clean surface on which the user may sit, and not currently occupied, using the sensor data;

determination a location of one or more corresponding seat belts associated with the one or more available clean passenger seating locations; and performing assistance actions for the user with respect to the available clean passenger seating locations and the corresponding seat belts, including:

providing a notification to the user via transmission of a message identifying the one or more available clean passenger seating locations to an electronic device of the user;

providing one or more visual notifications for the user to see at respective locations of the one or more available clean passenger seating locations having a clean seating surface on which the user may sit; and providing one or more audio notifications for the user to hear at the respective locations of the one or more available clean passenger seating locations having a clean seating surface on which the user may sit.

* * * * *